(12) United States Patent
Hong et al.

(10) Patent No.: US 8,751,277 B2
(45) Date of Patent: Jun. 10, 2014

(54) METHODS AND SYSTEMS FOR DYNAMIC INVENTORY CONTROL

(71) Applicants: Andy Hong, Hsinchu (TW); Edwin D. Liou, Taipei (TW); Chiapin Wen, Taipei (TW); Winston Tsai, Hsinchu (TW); Chih-Sheng Shih, Jhubei (TW)

(72) Inventors: Andy Hong, Hsinchu (TW); Edwin D. Liou, Taipei (TW); Chiapin Wen, Taipei (TW); Winston Tsai, Hsinchu (TW); Chih-Sheng Shih, Jhubei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/728,703

(22) Filed: Dec. 27, 2012

(65) Prior Publication Data

US 2013/0117164 A1 May 9, 2013

Related U.S. Application Data

(62) Division of application No. 12/697,510, filed on Feb. 1, 2010, now Pat. No. 8,364,512.

(51) Int. Cl.
*G06F 17/00* (2006.01)

(52) U.S. Cl.
USPC ........................................ 705/7.12

(58) Field of Classification Search
USPC .......................................... 705/7.12
See application file for complete search history.

(56) References Cited

U.S. PATENT DOCUMENTS

| | | |
|---|---|---|
| 5,751,580 A | 5/1998 | Chi |
| 6,889,197 B2 | 5/2005 | Lidow |
| 7,054,706 B2 | 5/2006 | Kempf et al. |
| 7,398,232 B2 | 7/2008 | Renz et al. |

FOREIGN PATENT DOCUMENTS

CN 1480889 3/2004

*Primary Examiner* — Thomas Dixon
(74) *Attorney, Agent, or Firm* — Lowe Hauptman & Ham, LLP

(57) ABSTRACT

A production management system is configured to dynamically control inventory of a semiconductor product to prevent overstock and stockout. The production management system includes a production planning module including components containing data of demand forecast, and customer order. The production management system further includes a dynamic inventory control module including a dynamic inventory control simulation module and an inventory management system, wherein the inventory management system is configured to record real inventory data, and wherein the dynamic inventory control simulation module includes simulators for target inventory, future inventory, future shipment and semiconductor product production.

20 Claims, 12 Drawing Sheets

METHODS AND SYSTEMS FOR DYNAMIC INVENTORY CONTROL

CROSS-REFERENCE TO RELATED APPLICATION

The present application is a divisional of U.S. application Ser. No. 12/697,510, filed Feb. 1, 2010, which is incorporated by reference herein in its entirety.

FIELD

This application relates to supply chain management and, more particularly, to inventory control.

BACKGROUND

The prevalent usage of Internet for information gathering and sharing, social networking, and commerce have given users reasons to demand new computation and communication hardware with more memories and faster processing rates. The advancement of semiconductor manufacturing has lowered the cost of manufacturing semiconductor chips and makes such new hardware affordable to the majority of people all over the world. Examples of hardware that utilize such new semiconductor chips include computers, personal digital assistants (PDAs), mobile phones, global positioning systems (GPSs), etc. Further, with the lowering of manufacturing costs of semiconductor chips, the usage of semiconductor chips are increasing expanded in other fields and applications. For example, more and more components of automobiles and home appliances include semiconductor chips as controllers, sensors, displays, etc. With the expanded applications, processing capabilities, and/or storage capacities, the demand for semiconductor chips has greatly increased. At the same time, the chip design and product cycles of semiconductor chips have both shortened to meet the demand of end users. Semiconductor manufacturers also need to respond to the shortened cycles to bring products to the market in a timely manner.

The manufacturing of semiconductor chips involves substrate processing to make devices and die packaging. Semiconductor substrate processing involves film deposition, lithographical patterning, dopant implant, etching, planarization, cleaning, etc. Some semiconductor chips require 50 lithographical layers or more to define and to connect devices. Therefore, the manufacturing of semiconductor chips from bare silicon substrates to assembled and tested chips can take 2-3 months. With instability in the global economy and consumers' interests, managing the inventory of semiconductor chips is very challenging. Overstocking of semiconductor chips very costly. On the other hand, shortage of stock (or stockout) can pose serious problems for customers. How to properly manage (or control) inventory to meet the demand is critical.

SUMMARY

Broadly speaking, the embodiments of the present application fill the need of properly controlling product inventory of semiconductor chips by providing methods and systems of dynamic inventory control. The methods and systems timely modify parameters affecting inventory. The parameters may include target inventory, cycle time, wafer start, future inventory and future shipment. In addition, the methods and systems gather real-time customer demand forecast to assist in production planning and adjustment. Further, the methods and systems identify inventory control turning points dynamically to adjust production activities to prevent overstock and to prevent stockout, i.e., out of stock situations.

In one embodiment, a method of controlling inventory of a product to prevent overstock is provided. The method includes an operation of establishing initial forecast of target inventory, wafer start, inventory, shipment, cycle time, upper inventory threshold, and lower inventory threshold for a product. The method further includes an operation of reviewing and comparing real inventory and target inventory data on a periodic basis. The method also includes the operation of determining if real inventory exceeds the upper inventory threshold for a number of consecutive review periods. If the answer is yes, the method includes reducing a forecast for target inventory, and proceeding to the operation of determining if an end of product life cycle has been reached. If the answer is no, proceeding to an operation of determining if the end of product life cycle has been reached. In addition, the method includes an operation of determining if an end of a product life cycle has been reached. If the end of the product life cycle has been reached, the operation is terminated. If the end of the product life cycle has not been reached, the method returns to the operation of reviewing and comparing real inventory and target inventory data.

In another embodiment, a method of controlling inventory of a product to prevent stockout is provided. The method includes an operation of establishing initial forecast of target inventory, wafer start, inventory, shipment, cycle time, upper inventory threshold, and lower inventory threshold for a product. The method also includes the operation of reviewing and comparing real inventory and target inventory data on a periodic basis. The method further includes determining if real inventory is lower than the upper inventory threshold for a number of consecutive review periods. If the answer is yes, the method decreases cycle time and increases wafer start, and proceeds to an operation of determining if an end of a product life cycle has been reached. If the answer is no, the method proceeds to an operation of determining if the end of product life cycle has been reached. In addition, the method includes an operation of determining if the end of the product life cycle has been reached. If the end of the product life cycle has been reached, the operation is terminated. If the end of product life cycle has not been reached, the method returns to the operation of reviewing and comparing real inventory and target inventory data.

In yet another embodiment, a production management system to dynamically control inventory of a semiconductor product to prevent overstock and stockout is provided. The production management system includes a production planning module including components containing data of demand forecasts, and customer orders. The production management system also includes a dynamic inventory control module including a dynamic inventory control simulation module and an inventory management system. The inventory management system records real inventory data. The dynamic inventory control simulation module includes simulators for target inventory, future inventory, future shipment, and semiconductor product production.

Other aspects and advantages of this disclosure will become apparent from the following detailed description, taken in conjunction with the accompanying drawings, illustrating by way of example the principles disclosed by this application.

BRIEF DESCRIPTION OF THE DRAWINGS

The present disclosure will be readily understood by the following detailed description in conjunction with the accompanying drawings, and like reference numerals designate like structural elements.

DETAILED DESCRIPTION

Figure 1:
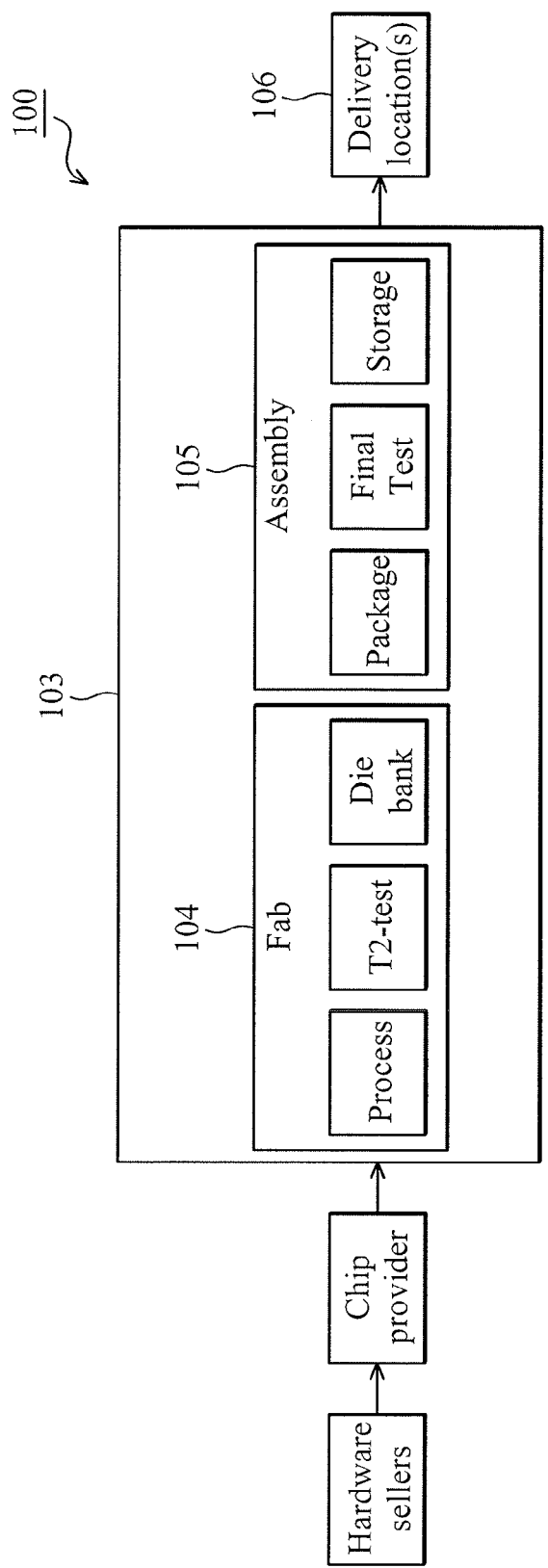
FIG. 1 is a high-level flow diagram of an exemplary process flow 100 of order and manufacturing of semiconductor chips.

It is to be understood that the following disclosure provides many different embodiments, or examples, for implementing different features described in this disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows an exemplary process flow 100 of order and manufacturing of semiconductor chips. The process starts with hardware sellers 101, such as computer or cell phone manufacturers/sellers, ordering semiconductor chips, such as graphic chips, from a chip provider 102. In the example here, the chip provider is a fabless design company that relies on semiconductor foundry companies to make the graphic chips that the chip provider designs. Alternatively, an integrated device manufacturer (IDM) can also rely on semiconductor foundry companies to produce semiconductor chips. IDMs are chip providers that also have chip manufacturing capabilities.

After receiving orders of semiconductor chips from the hardware sellers, the chip provider then places chip orders with a chip manufacturer 103 (a semiconductor foundry company in this example) to make semiconductor chips. Based on the order(s), the chip manufacturer processes substrates in a fabrication facility (or fab) 104 to make and test the devices as semiconductor chips. Chip manufacturing materials, such as substrates, chemicals, and processing equipment, need to ordered and prepared to allow the substrate processing to take place. As mentioned above, many processing steps are involved in the making of the semiconductor devices on the substrates (or wafer). For example, the number of processing steps can be 300 steps or more, and the number of lithographical layers (or patterning steps) can be 50, or more. To complete the entire processing sequence in the fab can take a few months.

After substrate processing is completed, circuits on each die of the substrates are electrically tested to determine how many dies on the substrates are usable (working dies). The substrates can be temporarily stored in a die bank before being shipped to an assembly facility 105. In the assembly facility, the semiconductor dies on the substrates are sawed and working dies are packaged. After packaging, the packaged dies undergo final tests to ensure that packaged dies are still functional. The packaging and final test performed at the assembly facility can take a few weeks. Afterwards, the finished chips are placed in storage before being shipped to the delivery location(s) specified by the chip provider.

As mentioned above, in order to produce semiconductor chips, chip manufacturing materials, such as substrates, chemicals, etc., and chip processing equipment need to be ordered and prepared to allow the substrate processing, packaging, and testing to occur. Over-supply of the chip manufacturing materials and over-capacities (or under-utilization) of the equipment are very costly, since some of the materials and the equipment can be very expensive. For example, many types semiconductor manufacturing equipment cost multiple millions of dollars each. In addition, if the demand forecast is not correct, the inventory of the semiconductor chips can be too great or too small. Too much chip inventory is costly for the chip manufacturers. Too little chip inventory runs the risk of stockout, which results in not being able to meet demands of customers.

Managing the supply chain activities of semiconductor manufacturing in order to take orders to transform materials (such as substrates, chemicals, etc.) with the help of resources (such as equipment, people, etc.) into finished products (semiconductor chips), and then delivering these products to the customers becomes very crucial in reducing the cost of semiconductor manufacturing. Inventory control in the supply chain management for manufacturing of semiconductor chips is especially important due to the market fluctuation and short development and product cycles of semiconductor chips.

Figure 2:
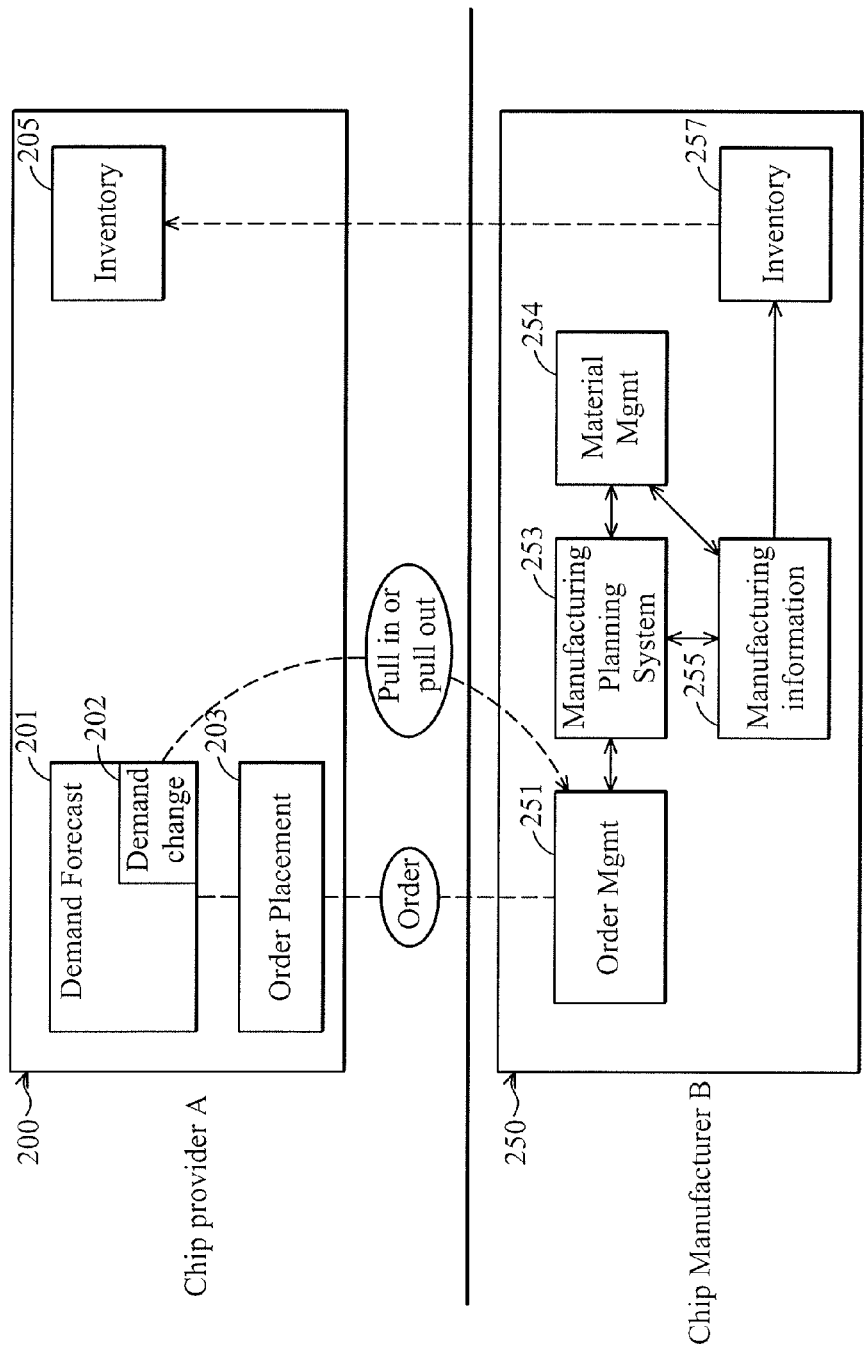
FIG. 2 is a high-level functional block diagram of an information system of a chip provider, and an information system of a chip manufacturer, in accordance with one embodiment of this disclosure.

FIG. 2 shows an information system 200 of a chip provider A, and an information system 250 of a chip manufacturer B, in accordance with one embodiment of this disclosure. In this example, chip manufacturer B produces semiconductor chips for chip provider A; therefore, chip provider A is a customer of chip manufacturer B. The information system 200 of chip provider A manages demand forecast, order (or order placement), and inventory. In the example shown in FIG. 2, the demand information system 200 includes modules managing demand forecast 201, order placement 203, and inventory 205. The demand forecast module 201 may contain information from upstream customers, historical sales data, and market research data. For example, if chip provider A has a brand new product, chip provider A might need to rely on market research data to determine how many such chips will be needed in the market. In another example, if chip provider A has a newer version of a product, chip provider A could utilize the sales data of the older version of the product to forecast how many chips will be needed. The demand forecast module 201 may also include a sub-module 202 that handles demand change in response to sudden (or unexpected) changes in the market. The order placement module 203 contains order information. The inventory module 205 contains inventory information of various types of semiconductor chips of the chip provider A.

The information system 250 of chip manufacturer B is used to manage orders, manufacturing planning, manufacturing, material planning, and inventory of chips manufactured by chip manufacturer B. In the example in FIG. 2, system 250 has an order management module 251, a manufacturing planning system 253, a material management module 254, a manufacturing information module 255, and an inventory module 257. The order management module 251 records the amounts, the types, and the delivery dates of chips ordered by customers. The order information is fed to the manufacturing planning system 253, which determines the manufacturing schedule based on a number of factors, including the fab capacity. In at least some embodiments, the manufacturing capacity and schedule of chip manufacture B also influence the order taking. For example, sometimes chip manufacture B may need to turn down certain orders due to lack of manufacturing capacity.

The manufacturing planning system 253 is coupled to a material management system 254, which manages the order and the supply of materials needed to produce the chips. The manufacturing schedule is then communicated to the fab, which records its manufacturing information (or data) in manufacturing information module 255. The manufacturing data may be at any combination of substrate level, die level and packaged chip level. Once the manufacturing of the semiconductor chips is completed, the products are shipped to storage and the product information (such as types and amounts) is recorded in the inventory module 257. Afterwards, the products are delivered to the location(s) specified by chip provider A. Once the products are delivered to specified location(s), the delivery information (such as types and amount of chips and delivery dates) is recorded in the inventory module 205 of chip provider A and the inventory module 257 of chip manufacturer B.

In the example of FIG. 2, the two information systems, system 200 and system 250, are not linked and often the information is not shared in a timely manner. Due to the lack of or delay of information sharing, order management, manufacturing planning, and material planning become very difficult and inefficient, especially when the demand fluctuates significantly. Without proper planning, the fab utilization may sometimes be too high so that some customer orders might be turned down. On the other hand, the fab utilization may sometimes be too low, which results in waste of resources. Due to market fluctuation, chip provider A could request a pull-in (earlier delivery) or a pull-out (delayed delivery) of orders. Such unexpected changes worsen the planning and management of resources for chip manufacturer B.

To meet the demand of customers, chip manufacturers, such as manufacturer B, normally keep a buffer inventory of already-made products (semiconductor chips) in storage. As mentioned above, managing inventory level is important and challenging, since excess inventory is costly and low inventory could result in stockout (or out of stock). Currently, there are two well-known methods of planning inventory. One method is to plan inventory based on demand forecast. However, since customers are fearful of stock-out, they tend to order extra when the demand trends are up. Such buffer in ordering during periods of trending up can come from multiple customers and results in significant overstock at the chip manufacturer's storage facilities. Such overstock phenomenon during demand trending up periods is commonly called a bullwhip effect.

Another method of inventory planning is based on shipment. The method can also be called a demand-pull method. For this method, the inventory is kept to a constant level. If more products are shipped, more products are made to replenish the stock, and vice versa. Such inventory planning methods were very popular in the 1980s and were popularized by Toyota Motor. However, such methods work well in a stable market but do not work well in a market with frequent and significant fluctuations. When the demand fluctuates often and by significant amounts, the inventory can easily run out. In addition, semiconductor chip manufacturing has long lead-times. This method does not work well with products with long lead-times.

To avoid the problems associated with overstock and stock-out described above, it is desirable to have an integrated supply chain with a dynamic inventory control algorithm that can respond to the changes in order and demand forecast effectively. If the demand forecast and inventory information of customers (chip providers) are known to the chip manufacturers (especially in real time), the chip manufacturers can more effectively plan and respond to fluctuations in the market. In addition, a dynamic inventory control method that can respond to fluctuation in shipment and forecast would help to minimize the impact of the fluctuation.

Figure 3:
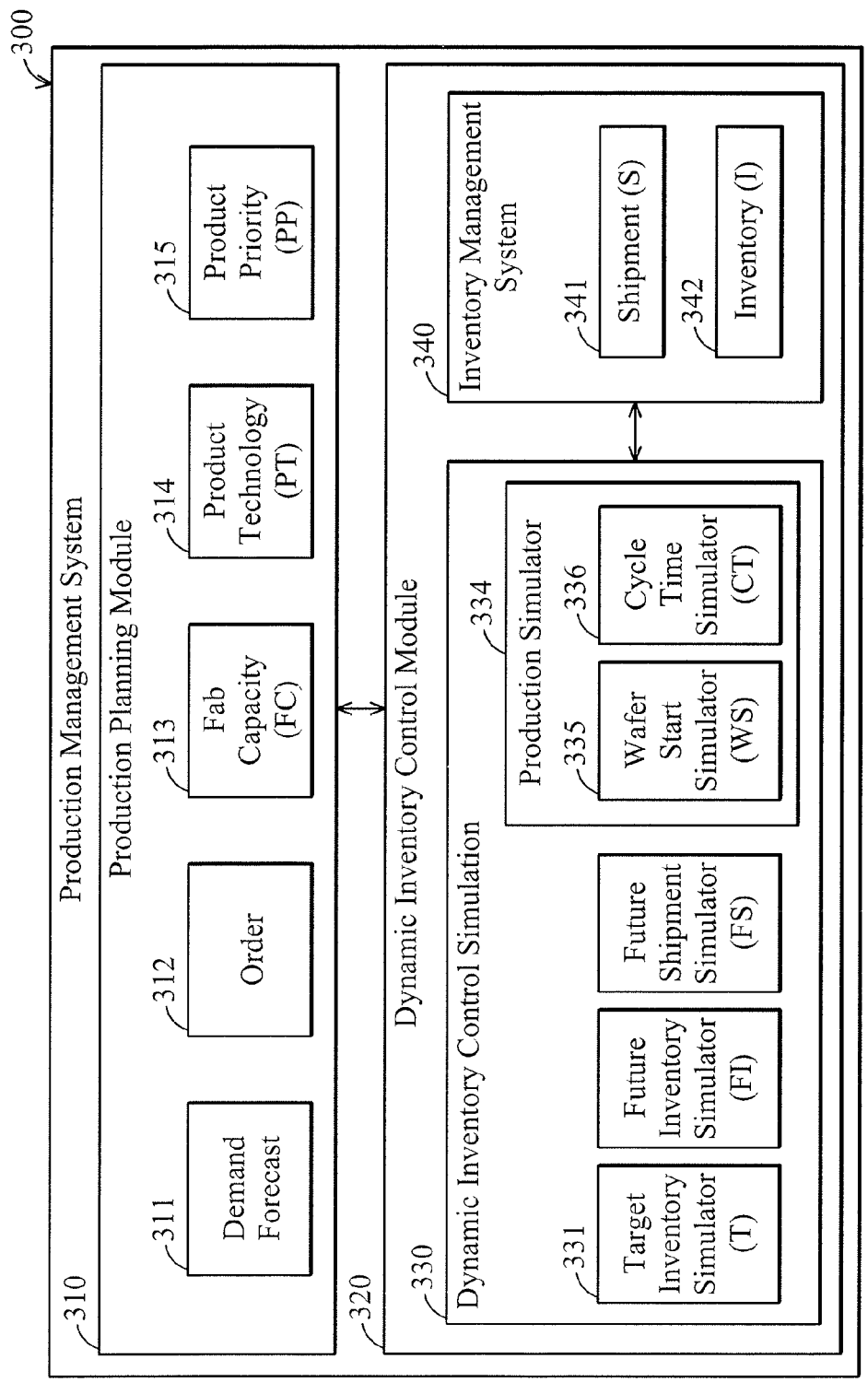
FIG. 3 is a high-level functional block diagram of a production management system, in accordance with one embodiment of this disclosure.

FIG. 3 shows production management system 300, in accordance with one embodiment of this disclosure. The production management system 300 is used to manage the production of semiconductor chips produced by a chip manufacturer, such as chip manufacturer B described above. The production management system 300 includes a production planning module 310 and a dynamic inventory control module 320. In the example of FIG. 3, the production planning module 310 includes a demand forecast component 311, which may store demand forecast data from customers, the sales data of the customers, the inventory data from the customers, the shipping histories of various products of the chip manufacturer, and market research data of semiconductor chips. The forecast component 311 is configured to calculate and estimate the demand curve based on the information collected in the system. If the customers' sales data, demand forecast and inventory data are included, the forecast demand component 311 can more accurately calculate and estimate the demand curve. Further, if the customers' data were fed to the demand forecast in real time or with little delay, the demand prediction would be even more accurate. The shipping histories of products are useful in providing seasonal demand trends in products. Market research data are useful in predicting overall market trend and for predicting demands for new products.

Module 310 also includes an order component 312, which stores order information. Product order directly affects production, inventory and shipment. Further, module 310 includes a fab capacity component 313, which includes information related to the manufacturing capacity and types of products manufactured in the fab(s). Manufacturing fab(s) of a chip manufacturer often needs to make different types of chips for multiple customers. A piece of manufacturing equipment can be used to process different products. The availability of production equipments affects production schedule and planning. Module 310 may further include a product technology component 314. Different types of semiconductor chips use different photolithography masks, and may require different numbers of lithographical layers. Further, different products (types of chips) may use different process flows, and are under different process technology nodes. For example, some chips utilize 65 nm technology, while others might use 40 nm technology. Different process technology nodes could use different processes and equipment in some process steps. Sometimes, substrate sizes can be different, such as 8 inches versus 12 inches. In addition, module 310 may include a product priority component 315. The semiconductor foundry fabrication facility receives orders for a variety of products. In one embodiment, some products are marked to have different production priorities from others. Such priority information is stored in the product priority component 315.

The production planning module 310 is coupled to (or connected to) the dynamic inventory control module 320. The dynamic inventory control system 320 has an inventory management system 340, which stores inventory and shipment data. In the example shown in FIG. 3, the inventory management system 340 has a shipment information component 341 an inventory information component 342. The data in components 341 and 342 are real shipment and inventory data, not simulated data. The inventory and shipping data may be current, historical and predictive (future targeted). The inventory control system 320 further includes a dynamic inventory control simulation module 330, which perform simulations based on real time information, historical trends and market research information. The simulation module 330 is capable of dynamically simulating and predicting a number of parameters in response to real time data and real time changes. The simulation module 330 simulates the number of parameters for the next few days, next few weeks, next few months, and next few years (until the end of product life cycle).

In one embodiment, the dynamic inventory control simulation module 330 includes an inventory target simulator 331, which simulates ideal inventory target based on a number of parameters. The inventory of semiconductor chips is typically reviewed on a regular basis by the manufacturer, such as daily, every few days, weekly, every few weeks, monthly, etc. In one embodiment, target inventory at the next review period ($T_{i+1}$) is expressed as equation (1):

$$T_{i+1} = IT_i + \Delta T_i \quad (1)$$

Where "i" is a particular review period, and i+1 is the next review period after review period "i". IT is the initial target inventory. IT can be a function of time or a constant. In one embodiment, IT can be set based on a number of parameters, such as initial order (IO), historical trend (HT), seasonal effect (SE), etc. These relationships are expressed as equation (2):

$$IT_i = f(IO_i, HS_i, SE_i, \ldots) \quad (2)$$

$\Delta T$ is determined by a number of parameters, such as target inventory (T), current inventory (I), future (or simulated) inventory (FI), and future (or simulated) shipment (FS). Future inventory (FI) can also be called forecast demand (FCST).

$$\Delta T_i = f(T_i, I_i, FI_i, FS_i \ldots) \quad (3)$$

The dynamic inventory control simulation module 330 also includes a future inventory (FI) simulator 332, which simulates future inventory based on real inventory (I), wafer start (WS), and future shipment (FS, based on forecast). In one embodiment, FI can be expressed as equation (4).

$$FI_{i+1} = I_i + WS_i - FS_i \quad (4)$$

$I_i$ is the real inventory (not simulated) of review period "i". $WS_i$ describes how working chips can be produced by a number of wafers being started (or being added to the processing line) at review period "i". In one embodiment, $WS_i$ is calculated by the number of wafers started per period (number of wafers being put into process line) multiplying the number of dies on a wafer (or substrate), and multiplying a fraction of usable chips out of the number of dies on the wafer. WS is determined by a number of parameters, such as target inventory (T), real inventory (I), future inventory (FI), future shipment (FS), etc.

$$WS_i = f(T_i, I_i, FI_i, FS_i, \ldots) \quad (5)$$

Future shipment (FS) can be determined by a number of parameters, such as historical trend (H), seasonal effect (SE), target inventory (T), current inventory (I), future inventory (FI), future shipment (FS), etc., as shown in equation (6) below.

$$FS_i = f(H_i, SE_i, T_i, FI_i, FS_i, \ldots) \quad (6)$$

Simulation module 330 further includes a future shipment simulator 333, which simulates future shipment based on a number of parameters, described in equation (6) above. In addition, the simulation module 330 includes a production simulator 334, which includes a wafer start (WS) simulator 335 and a cycle time (CT) simulator 336, in accordance with one embodiment of this disclosure. The relationship between wafer start (WS) and a number of parameters that affect WS has been shown above in equation (5). Cycle time describes how much time it takes to produce the chips. Since different types of chips require different process sequences and different lithographic masks, the cycle time of a product is often measured in numbers of days to finish a layer (days/layer). Each product has a cycle time, which is estimated by dividing the number of days to finish the product by the number of lithographic layers. For example, if a product takes 90 days to complete and there are 60 lithographical layers, the cycle time of this product is 1.5 days/layer. In one embodiment, cycle time (CT) can be expressed as equation (7).

$$CT_{i+1} = CT_0 + \Delta CT_i \quad (7)$$

Where $CT_0$ is the initial fab cycle time. $CT_0$ is affected by a number of parameters, such as Product Technology (PT), Product Priority (PP), and Fab capacity (FC).

$$CT_0 = f(PT, PP, FC) \quad (8)$$

$\Delta CT$ is affected by a number of parameters, such as target inventory (T), real inventory (I), future (or simulated) inventory (FI), future (or simulated) shipment (FS), etc., as shown in equation (9) below.

$$\Delta CT_{i+1} = f(T_i, I_i, FI_i, FS_i, CT_0, \ldots) \quad (9)$$

The various simulators in the dynamic inventory control simulation module 330 uses the information in module 310 and in the inventory management system 340 to predict the ideal target inventory, future inventory, future shipments, wafer starts, and cycle times to assist the production of semiconductor chips.

As mentioned above, the important task of the dynamic inventory control simulation module 330 is to anticipate and to respond to upcoming, sudden, or immediate changes (unexpected changes) in demand. If there are changes in demand, there needs to be an algorithm to determine if such changes are significant enough to warrant production change. Typically the target inventory includes a buffer inventory to prevent stock becoming too low.

Figure 4:
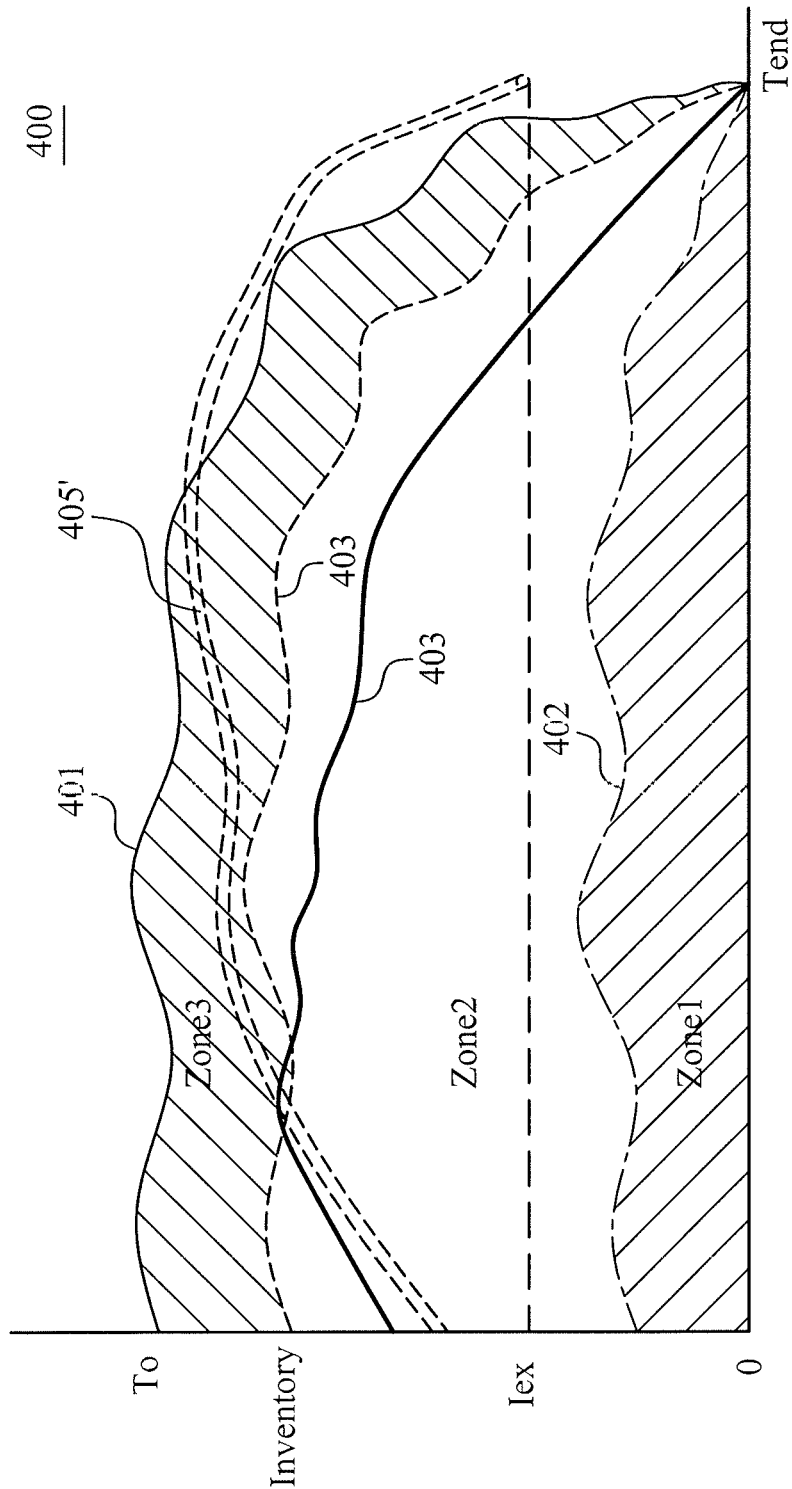
FIG. 4 is a graph of inventory and target inventory as a function of time, in accordance with one embodiment of this disclosure.

FIG. 4 shows a diagram 400 of inventory and target inventory as a function of time, in accordance with one embodiment of this disclosure. The Y-axis of the diagram 400 is inventory and the X-axis is time. In diagram 400, $T_{end}$ corresponds to the end time of a product cycle. There are 4 curves in FIG. 4. Curve 401 represents the target inventory, which starts at $T_0$ (initial inventory target). The area under curve 401 is divided into three zones. Zone 1 is defined by curve 402 and zero inventory (Y=0). Zone 1 is a region in which the inventory is considered to be low. If the inventory falls into this low region, there is a great risk of stockout. Zone 2 is defined between curve 402 and 403 and is considered a safe zone. The inventory is not too high and not too low. Zone 3 is defined between curve 403 and target inventory (401). Inventory in this region is relatively high. As we have discussed above, there is a cost associated with having a relatively high inventory. The ideal situation is to have the real inventory fall back into Zone 2.

Curve 405 of FIG. 4 is the real inventory. As we can see from FIG. 4, the real inventory of this product falls mostly in Zone 2, with an exception at $t_{out}$. At $t_{out}$, the inventory (curve 405) crosses curve 403, and the real inventory almost goes into Zone 3. In this case, there is no need to change the target inventory or production plan. However, another real inventory curve 405" was in Zone 2 only before $t_{out}$. After $t_{out}$, the inventory continues to go up, possibly due to a reduction in market demand. At $t_{ex}$, curve 405' is even higher (exceeding) the target inventory. With the weak demand of the market and also without proper correction, the inventory (cure 405') continues to stay high, which results in a large amount of inventory ($I_{ex}$) at the end of product life cycle (at $T_{end}$).

When curve 405' crosses curve 403 to move into Zone 3 for a period, the production plan and inventory target should be altered to avoid the excess inventory situation we described above. Similarly, if the inventory falls too low to an extent that signals a risk of stock out, the production plan and inventory target should also be modified. Therefore, it is important to establish an algorithm that identifies an inventory control turning point. When an inventory control turning point has been reached, or meets the criteria to make production planning modification, the simulators determine the types and amount of changes needed. The simulators make the best and appropriate adjustment based on the data in the system, instead of over-reacting as occurs without a proper calculation.

Algorithm I

Algorithm I is used to determine an inventory control turning point of too much inventory, in accordance with one embodiment of this disclosure.

If $I_i > CU_i * T_i$ over M number of review cycles, i, i+1, i+2, ... i+M−1

Lower future inventory target $T_{i+M}$, $T_{i+M+1}$, $T_{i+M+2}$, ... where $CU_i$ is an upper control (or threshold) fraction (a number less than 1), and $T_i$ is the current inventory target at current time (t). $CU_i * T_i$ is an upper inventory threshold signaling high inventory. If the real inventory data are greater than the defined upper threshold(s) of inventory over an extended period, such as M review cycles, then the target inventory is lowered to prevent high inventory. As mentioned above, wafer start (WS), cycle time (CT), future shipment (FS), and future inventory (FI) can all be affected by changes in target inventory (T). M can be any integer and represents the number of review cycles that triggers the target inventory change (or signals reaching an inventory control turning point). The criteria for reaching an inventory control turning point are established to be high inventory(ies) (over threshold $CU_i * T_i$) over a number of (M) review cycles. Once criteria for the inventory control turning point are met, the inventory target for the next review cycle and future review cycles, such as $T_{t+M}$, $T_{t+M+1}$, $T_{t+M+2}$, ..., are lowered. CU (upper control fraction) can be a constant or can vary with the review period.

In one embodiment, the $T_{t+M}$, $T_{t+M+1}$, and $T_{t+M+2}$ are adjusted according to the equations below:

$$T_{t+M} = T_{t+M} - R_u * T_{t+M-1},$$

$$T_{t+M+1} = T_{t+M+1} - R_u * T_{t+M-1},$$

$$T_{t+M+2} = T_{t+M+2} - R_u * T_{t+M-1},$$

...

Where $R_u$ is a reduction ratio (<1). $R_u * T_{t+m+1}$ represents the amount of target inventory to be reduced at $T_{t+M}$. Alternatively, the $T_{t+M}$, $T_{t+M+1}$, and $T_{t+M+2}$ are adjusted according to the equations below:

$$T_{t+M} = T_{t+M} - R_u * T_{t+M-1},$$

$$T_{t+M+1} = T_{t+M+1} - R_u * T_{t+M},$$

$$T_{t+M+2} = T_{t+M+2} - R_u * T_{t+M},$$

...

$R_u$ can be a constant or can change based on a number of parameters, such as the value of inventory target and time (review period, time of year, ... ), etc.

In one embodiment, the number of cycles (M) with high inventory(ies) are defined based on a number of factors, such as the amount of high inventory, the requirement of business, the type of chip, historical trend, etc. M could be one, two, or more review cycles. Further, the target inventory are lowered for a number of review cycles (such as n cycles, where n is an integer) or for all future cycles.

EXAMPLE I

One example of applying algorithm is described below. In this example, the initial target inventory is set to be $T_0$, which is a constant. The algorithm for reaching inventory control turning point is shown below.

When $I_i > (2/3)T_i$ for 3 review period (t, t+1, t+2),

Set $T_{t+3} = T_{t+3} - (1/3)T_{t+2}$, $T_{t+4} = T_{t+4} - (1/3)T_{t+2}$, $T_{t+5} = T_{t+5} - (1/3)T_{t+2}$,

...

Once the inventory control turning point is reached, all future target inventories are adjusted. In this example, the CU is 2/3 and $R_u$ is 1/3. As described above, once the target inventory is adjusted, other simulated parameters are also adjusted. Adjusting the wafer start and cycle time will take a while to affect the inventory, since there is a lead-time in wafer and chip production. However, other parameters, such as future shipment and future inventory, can be adjusted immediately.

Figure 5A:
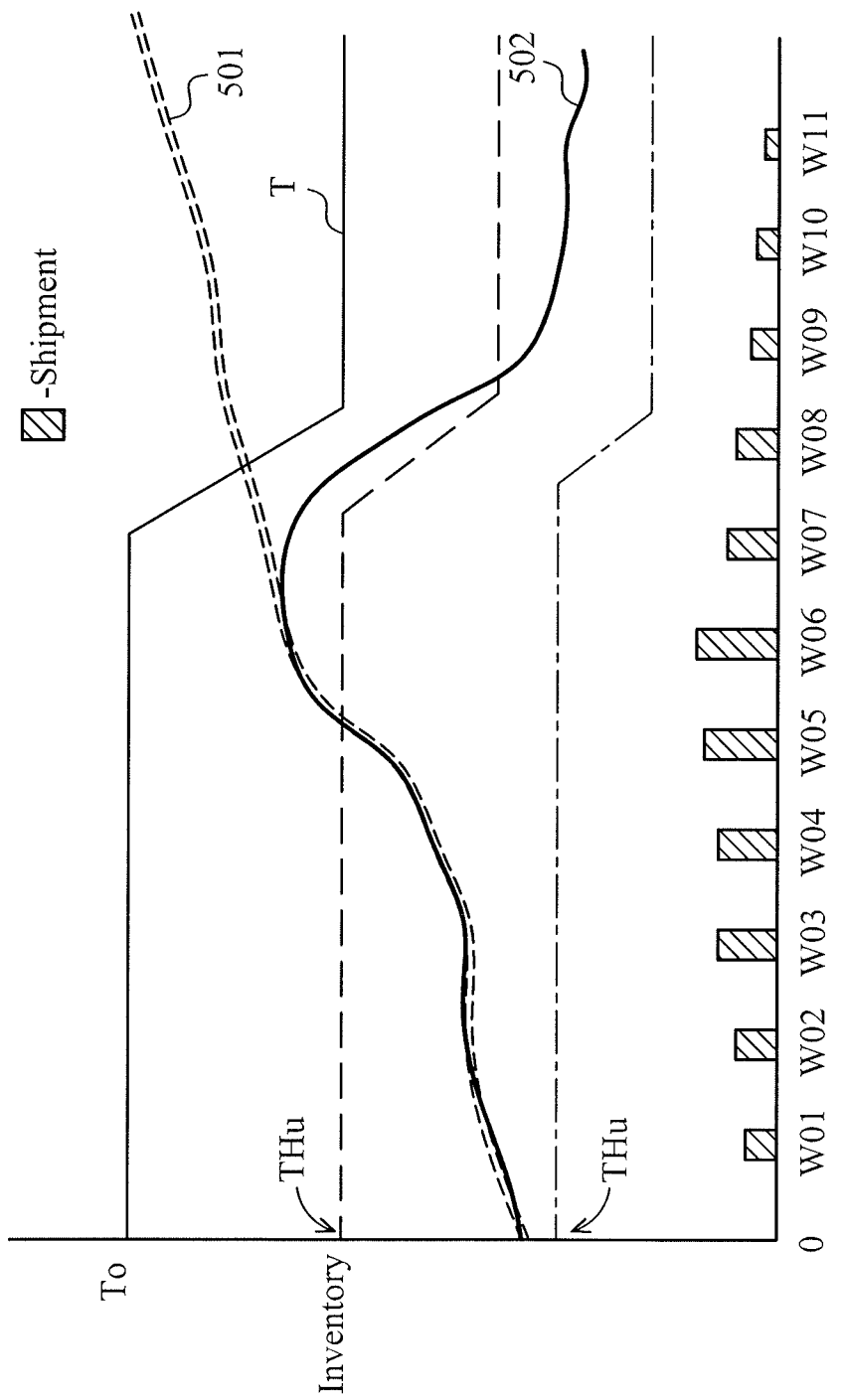
FIG. 5A is a graph of inventory and shipment of a product with and without using the algorithm described above in Example I to correct the target inventory, in accordance with one embodiment of this disclosure.

FIG. 5A shows a diagram of inventory and shipment of a product with and without using the algorithm described above in Example I to correct the target inventory, in accordance with one embodiment of this disclosure. The double-dotted curve 501 is the inventory curve without utilizing the inventory target correction algorithm. Without the correction, the inventory eventually goes out of control and exceeds the target inventory. In contrast, the solid curve 502 employs the correction algorithm. In the example shown in FIG. 5A, the target inventory is adjusted after inventory exceeds the upper inventory threshold for three consecutive review periods, W05, W06, and W07. After three weeks of high inventory, the target inventory is adjusted to be lower for W07, W08, and beyond. In the example in FIG. 5A, the shipment is reduced significantly in W08 and beyond. The lowering of the target inventory of W07 and beyond helps to bring the inventory back to the ideal zone of operation (middle zone between the upper inventory threshold $TH_u$ and lower inventory threshold $TH_1$). Note that the shipment in FIG. 5A is at a different scale in comparison to the inventory.

Figure 5B:
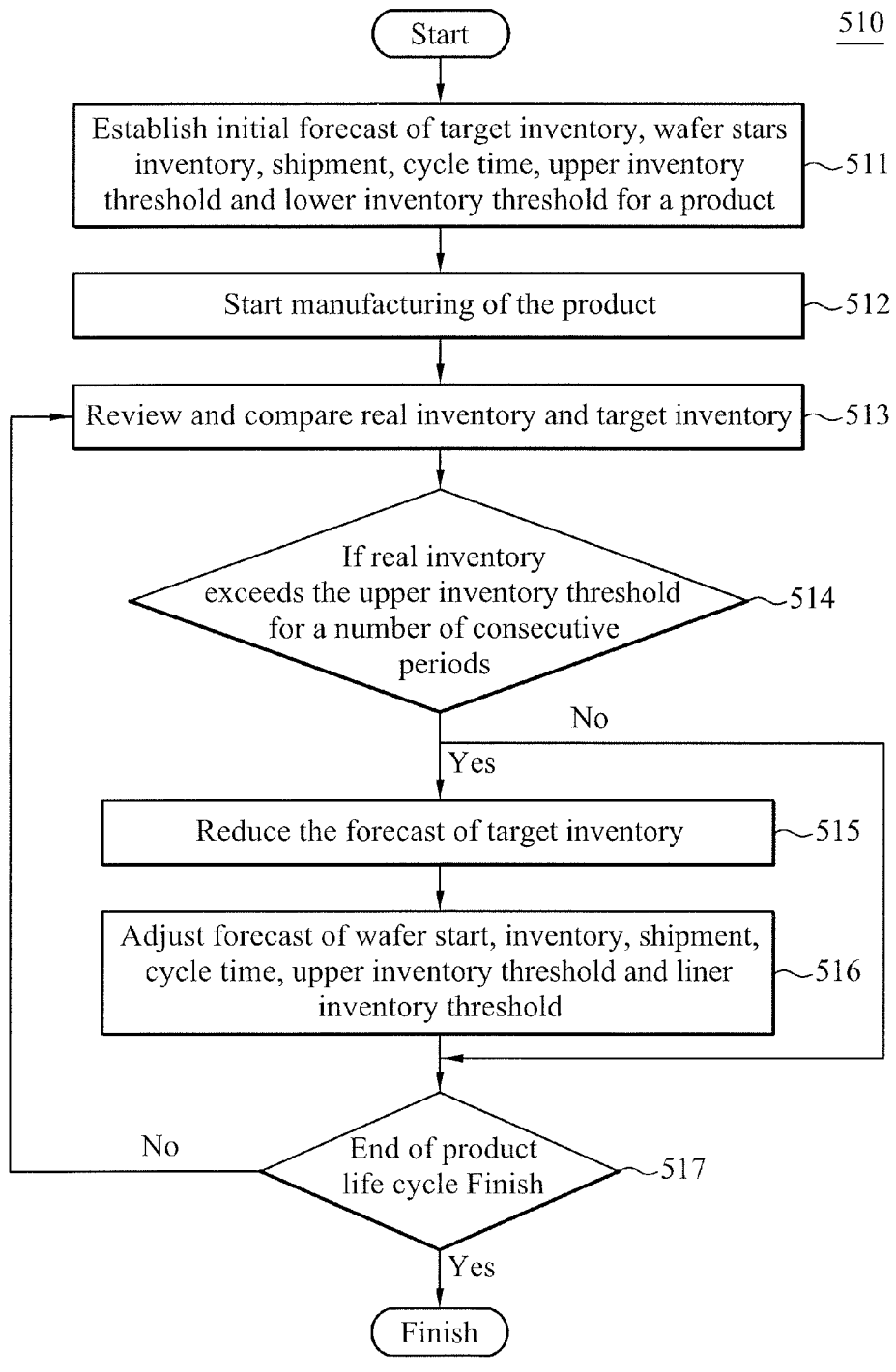
FIG. 5B is a high-level process flow diagram of controlling product inventory, in accordance with one embodiment of this disclosure.

FIG. 5B shows a process flow 510 of controlling product inventory of a semiconductor chip, in accordance with one embodiment of this disclosure. At operation 511, the initial forecast for target inventory, wafer start, shipment, inventory, cycle time, upper inventory threshold and lower inventory threshold is established for a product (a particular type of semiconductor chip). In one embodiment, the initial forecast is established for the entire product cycle. In another embodiment, the initial forecast is established for a period (not an entire product cycle). As described above, the initial forecast could be based on customer orders, customer forecast, shipping forecast, inventory forecast, current inventory, historical product data, and/or market research information. At operation 512, the manufacturing of the product is started. Alternatively, operation 512 can occur before operation 511. At operation 513, the actual inventory and target inventory data of the current period and the historical periods are reviewed and compared on a periodic basis. At operation 514, a decision is made regarding if the actual (or real) inventory exceeds an upper inventory threshold for a number of consecutive review periods. If the answer is yes, the operation proceeds to operation 515. At operation 515, the forecast of target inventory is reduced (or lowered). Examples of how the forecasts of target inventory can be adjusted are shown above. At the next operation 516, the forecast of wafer starts, inventory, shipment, cycle time, upper inventory threshold and lower inventory threshold is adjusted based on the forecast of target inventory arrived (or calculated) at operation 514. After operation 516 and at operation 517, it is decided if the end of product life cycle (or end of production) has been reached. If the answer is "yes", the process flow is completed. If the answer is "no", process flow returns to operation 513 to review and compare real inventory and target inventory data at the next review period. In addition, if the answer at operation 514 is "no", the operation proceeds to operation 517.

Algorithm II

Algorithm II is used to determine an inventory control turning point corresponding to too little inventory, in accordance with one embodiment of this disclosure.

If $I_i < CL_i * T_i$ over $O$ review periods, $i, i+1, i+2, \ldots$ $i+O-1$

Decrease future cycle time $CT_{i+O}, CT_{i+O+1}, CT_{i+O+2}, \ldots,$ and

Increase future wafer start $WS_{i+O}, WS_{i+O+1}, WS_{1+O+2}, \ldots$ where $CL_i$ is a lower control (or threshold) fraction (a number less than 1), and $T_i$ is the current inventory target at current time (t). $CL_i * T_t$ is a lower inventory threshold signaling low inventory. If the real inventory data are greater than the defined lower threshold(s) of inventory over a number of periods, such as $O$ review periods, then the cycle time needs to be reduced and wafer start needs to be increased to raise the production rate. As mentioned above in equation (4), wafer start (WS) and cycle time can affect future inventory (FI). $O$ can be any integer and represents the number of review cycles that signal reaching an inventory control turning point. Since running out of stock (or stockout) is highly undesirable, $O$ is a small integer number. In one embodiment, $O$ is smaller than M.

EXAMPLE II

One example is described below. The algorithm for determining an inventory control turning point is shown below.

When $I_i < (\frac{1}{3})T_i$ for one review period ($i$),

Set $CT_{i+1} = CT_{i+1} - F_{CT} * CT_{product}$, and $WS_{i+1} = WS_{i+1} + B * T_i$ where $F_{CT}$ is a cycle time fraction (a less than 1 number that is related to cycle time) and CT product is the cycle time of the product. The cycle time of the product can be shortened by running hot lots (cassettes of substrates identified to have processing priority compared to other lots). FCT is a number signaling how much a cycle time can be shortened as described in equation (10) below.

$$\text{Processing time for regular lots/Processing time for hot lots} = 1 + F_{CT} \qquad (10)$$

By running hot lots, the cycle time can be shorted by $F_{CT} * CT_{product}$. The inventory can also be increased by increasing wafer starts. For example, $F_{CT}$ can be 0.2, 0.3, or other less than 1 numbers. As shown above, the wafer start (or the number of wafers being started in a particular period) can be increased by a buffer amount ($B*Ti$). Extra wafers are started to ensure sufficient inventory and to prevent stockout. B is a positive number that is less than 1.

Figure 6A:
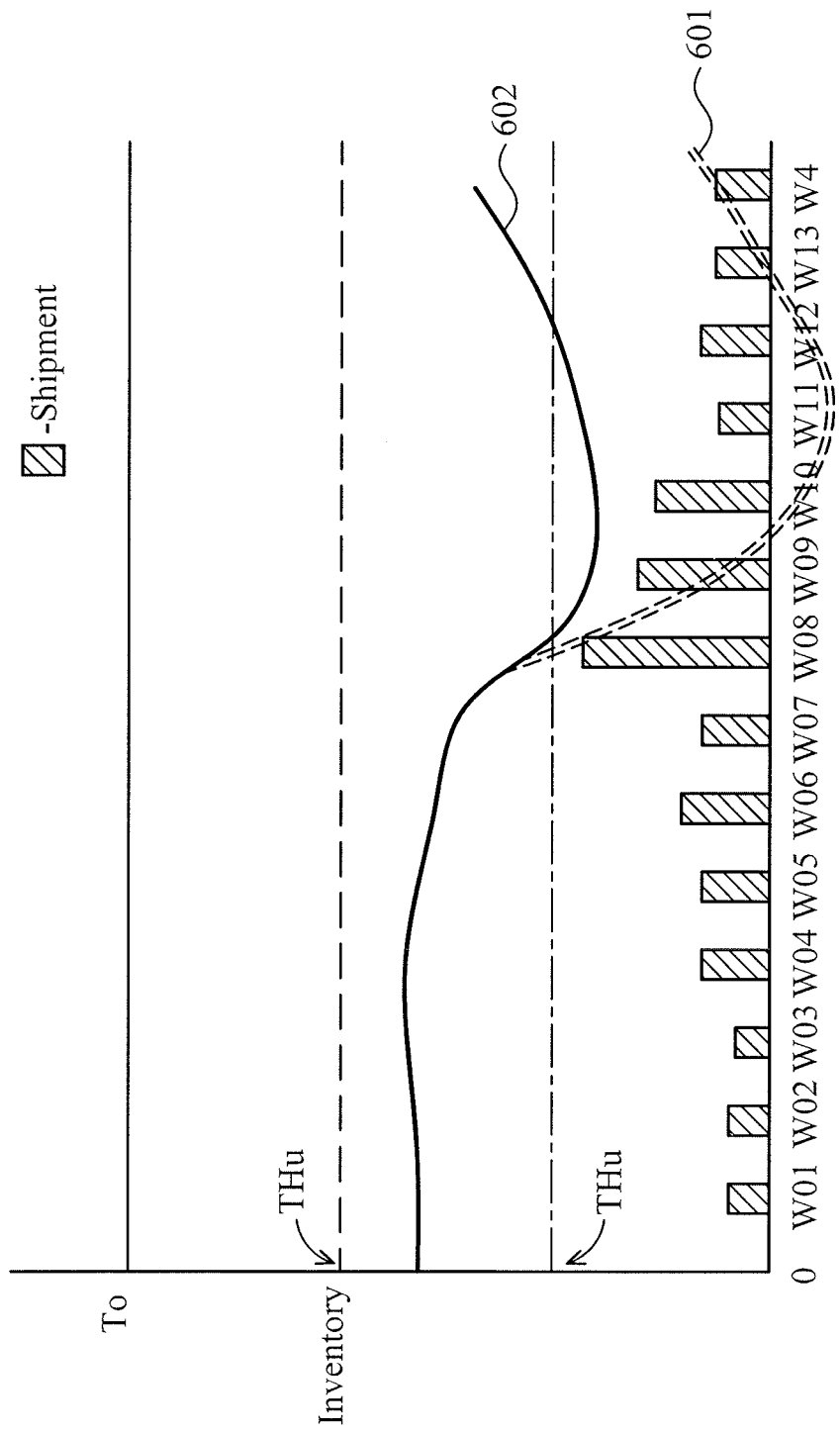
FIG. 6A is a graph of an inventory of a product with and without the utilization of the algorithm II described above to correct the target inventory, in accordance with one embodiment of this disclosure.

FIG. 6A shows an example of an inventory of a product with and without the utilization of the algorithm II described above to correct the target inventory. The dotted curve 601 is the inventory curve without utilizing the inventory target correction algorithm. Without the correction, the inventory ran out of stock. In contrast, the solid curve 602 employs the correction algorithm (algorithm II). In the example shown here, the inventory target is adjusted after the inventory falls below the lower threshold of inventory control ($TH_1$) at W8. The cycle time and wafer start are adjusted immediately without delay. The shipment is relatively higher in W8, W9 and W10. The decrease in cycle time and the increase in wafer start help to bring the inventory eventually back to the safe middle zone of between $Th_u$ (upper threshold) and $Th_7$ (lower threshold) of inventory. Note that the shipment in FIG. 6A is at a different scale in comparison to the inventory.

Figure 6B:
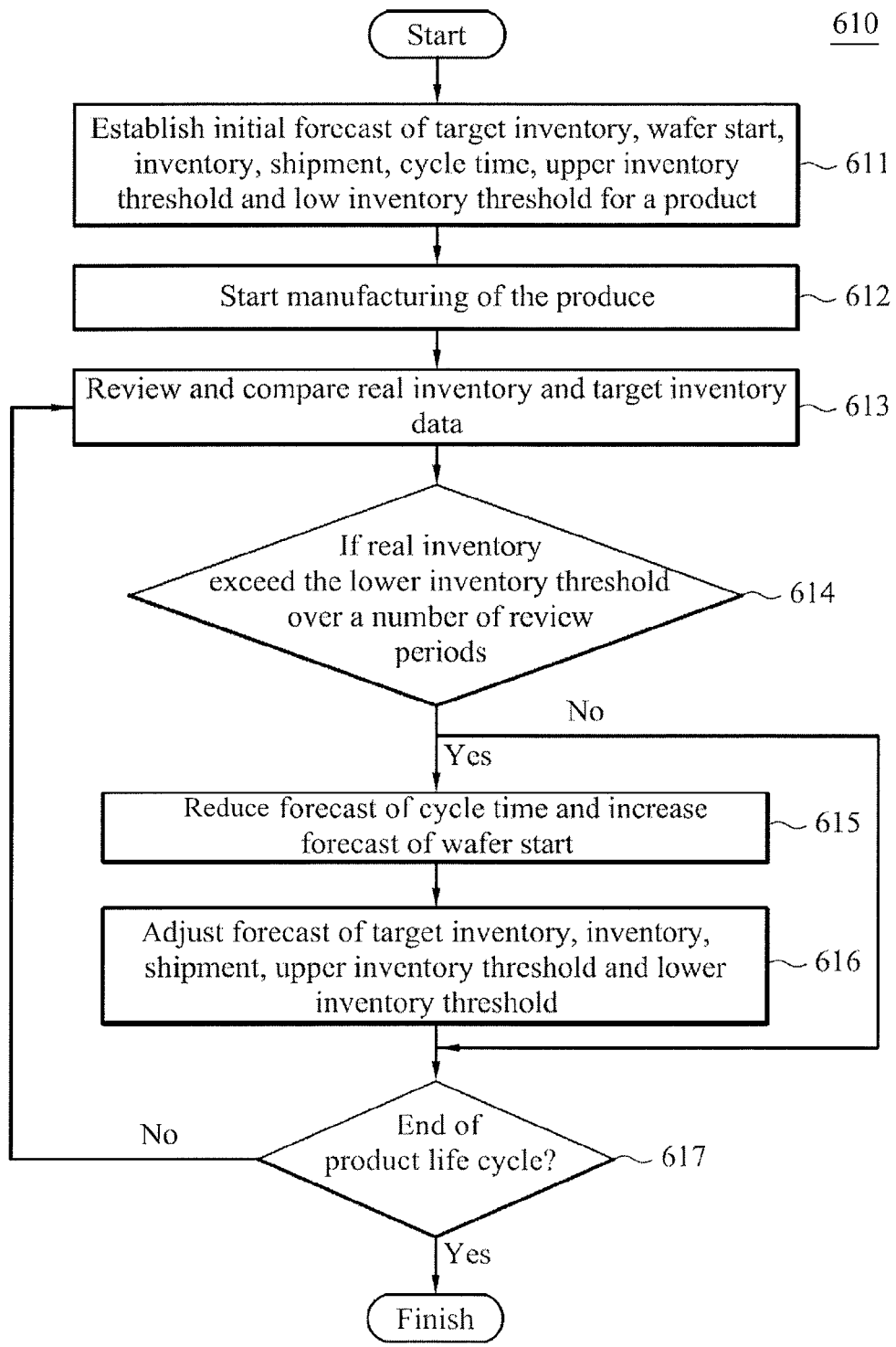
FIG. 6B is a high-level process flow diagram of managing product inventory using algorithm II, in accordance with one embodiment of this disclosure.

FIG. 6B shows a process flow 610 of managing product inventory using algorithm II, in accordance with one embodiment of this disclosure. At operation 611, the initial forecast for target inventory, wafer starts, shipment, inventory, cycle time, upper inventory threshold and lower inventory threshold are established for a product (a particular type of semiconductor chip). At operation 612, the manufacturing of the product is started. Alternatively, operation 611 can occur after operation 612. At operation 613, the actual inventory and target inventory data of the current period and the historical periods are reviewed and compared on a periodic basis. At operation 614, a decision is made regarding if the actual (or real) inventory falls below a lower inventory threshold for a number of consecutive review periods. If the answer is yes, the operation proceeds to operation 615. At operation 615, the forecast of cycle time is reduced and the forecast wafer start is increased. At the next operation 616, the forecast of target inventory, inventory, shipment, upper inventory threshold and lower inventory threshold are adjusted based on the forecast of cycle time and wafer start times (or calculated) at operation 615. After operation 616 and at operation 617, a decision of if the end of product life cycle (or end of production) has been reached or not is made. If the answer is "yes", the process flow is completed. If the answer is "no", process flow returns to operation 613 to review and compare real inventory and target inventory data at the next review period. In addition, if the answer at operation 614 is "no", the operation proceeds to operation 617.

Algorithm III

Algorithm III is used to determine an inventory control turning point for too little inventory.

If $I_j<0$ for any period in the future (j is a review period in the future)

Decrease $CT_{j\text{-}leadtime}=CT_{j\text{-}leadtime}-F_{CT}*CT_{product}$, and Increase $WS_{j\text{-}leadtime}=WS_{j\text{-}leadtime}-I_j+B*T_j$ if possible, otherwise, decrease CT and increase WS at the earliest possible cycle.

where $CT_{j\text{-}leadtime}$ is the cycle time at period (j-leadtime) and $WS_{i\text{-}leadtime}$ is the wafer start at period (j-leadtime). When the inventory forecast (simulated) is less than 0, the wafer start needs to be increased and the cycle time needs to be shortened to prevent this from happening or to keep the risk to a minimum. Typically, there is a lead-time for semiconductor chip manufacturing. Depending on the products, the complexity of the manufacturing process, and the fab capacity, the lead-time for a product can range from a few weeks to a few months. If based on the inventory simulation, the future inventory of one or more periods are less than zero (stockout), the cycle time needs to be reduced and the wafer starts need to be increased possibly a lead-time before the simulated stockout period. As shown above, the wafer starts can be increased by the amount of deficit in the inventory ($-I_i$ is a positive value). In addition, a buffer amount ($B*T_j$, where B is a fraction) can be added to ensure sufficient inventory. The amount $S_i-I_i$ is added to the wafer start because is likely that the situation is caused by a spike due to earlier shipping.

Since there is a lead-time for manufacturing, the cycle time and wafer start could be corrected a lead-time ahead of the time (i) that has stockout problem. However, sometimes, when the time "i" is identified to have a stockout problem, the time between now and time "i" is already less than the lead-time for the product. When this happens, the cycle time and the wafer time need to be adjusted as early as possible. Once the cycle time and wafer start are adjusted, the simulation can be used to see if the stockout at period "i" can be avoided or the amount of stockout be minimized. To bring the stock back, hot lots (with short cycle time) and increased wafer starts might need to be applied for a number of periods. If the inventory is adjusted to be greater than 0, but less than the lower threshold of the target inventory, the algorithm described in FIGS. 6A-6C should be used until the inventory is in the "safe" zone (zone 2).

EXAMPLE III

One example of algorithm III is described below. The algorithm for reaching inventory control turning point is shown below.

When $I_j<0$ for one future review period (j), $CT_{j\text{-}4\ weeks}=CT_{j\text{-}4\ weeks}-0.2*CT_{product}$, and $WS_{j\text{-}4\ weeks}=WS_{j\text{-}4\ weeks}-I_j+\frac{1}{3}*T_j$ if possible, otherwise, decrease CT and increase WS at the earliest possible cycle. where $F_{CT}$ is 0.2 and the lead-time is 4 weeks. B in this example is ⅓.

Figure 7A:
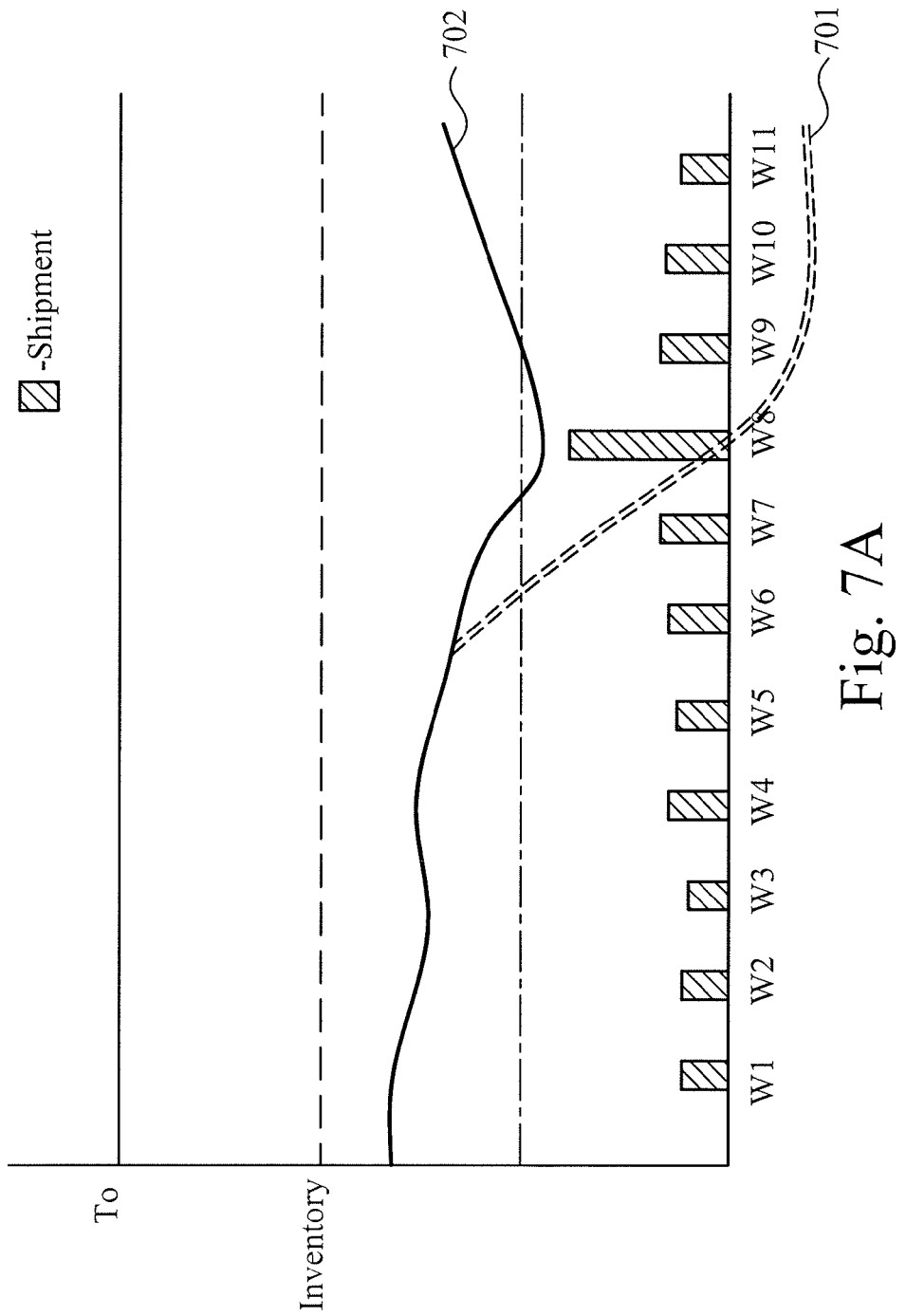
FIG. 7A is a graph of an inventory of a product with and without the utilization of the algorithm III described above to correct the target inventory, in accordance with one embodiment of this disclosure.

FIG. 7A shows an example of an inventory level of a product with and without the utilization of the algorithm III described above to correct the target inventory. The dotted curve 701 is the inventory curve without utilizing the inventory target correction algorithm. Without the correction, the inventory ran out of stock. In contrast, the solid curve 702 employs the correction algorithm (algorithm II). In the example shown here, the inventory forecast indicates that future inventory will fall below zero at W8 due to a sudden change in shipment forecast. This was found out after W3. The cycle time and wafer start are adjusted immediately without delay at W4. The adjustment avoided stockout. The decrease in cycle time and increase in wafer starts help to bring the inventory eventually back to the safe middle zone of between $Th_u$ (upper threshold) and $Th_l$ (lower threshold) of inventory. Note that the shipment in FIG. 7A is at a different scale in comparison to the inventory.

Figure 7B:
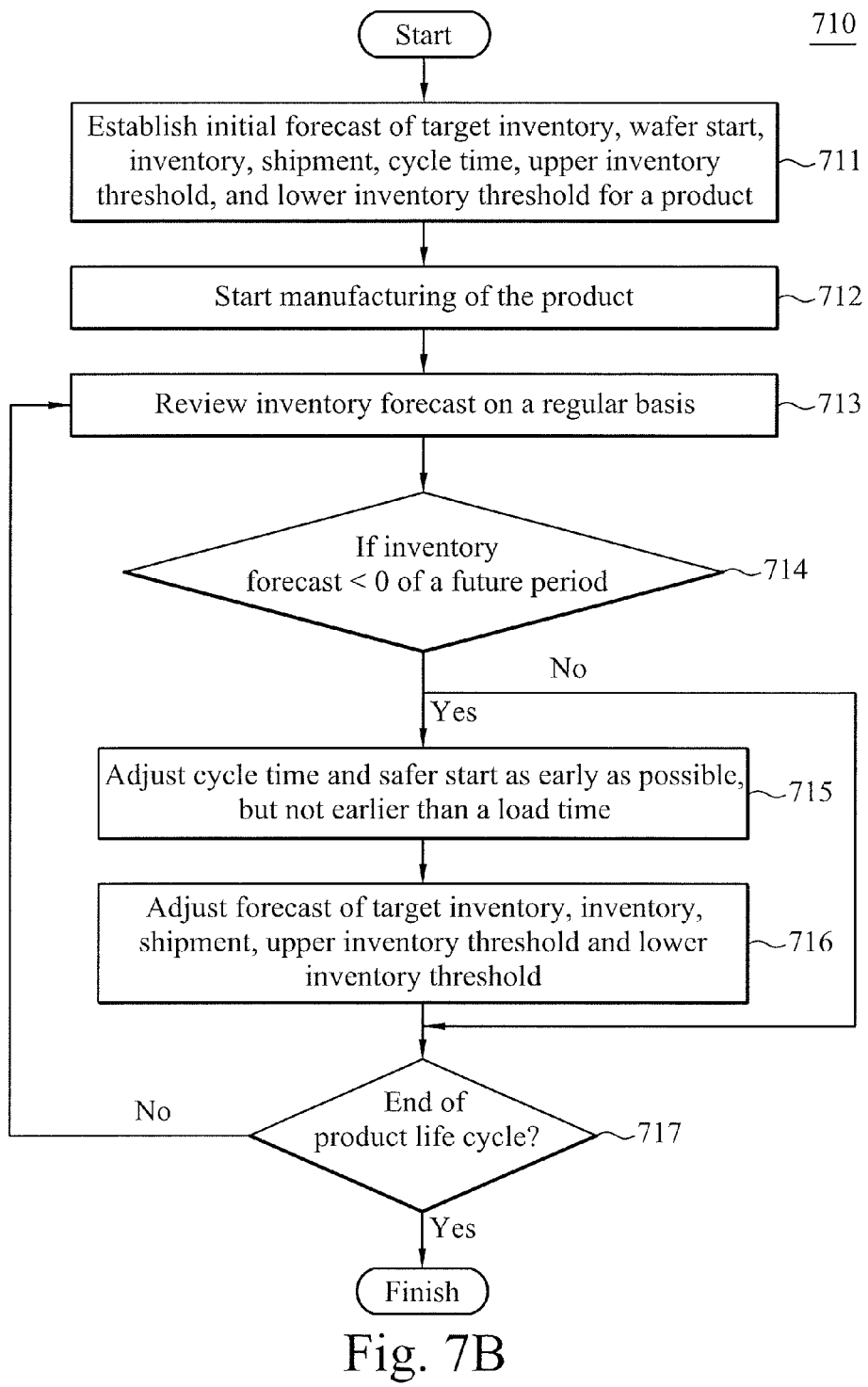
FIG. 7B is a high-level process diagram flow of managing product inventory using algorithm III, in accordance with one embodiment of this disclosure.

FIG. 7B shows a process flow 710 of managing product inventory using algorithm III, in accordance with one embodiment of this disclosure. At operation 711, the initial forecast for target inventory, wafer starts, shipment, inventory, cycle time, upper inventory threshold and lower inventory threshold are established for a product (a particular type of semiconductor chip). At operation 712, the manufacturing of the product is started. Alternatively, operation 711 can occur after operation 712. At operation 713, the forecast of inventory data is reviewed on a periodic basis. At operation 714, a decision is made regarding if future inventory of an upcoming period falls below zero. If the answer is yes, the operation proceeds to operation 715. At operation 715, the cycle time is reduced and the wafer starts are increased starting at a period as early as possible and less than a lead-time from the identified period (the period the inventory forecast falls below zero). At next operation 716, the forecast of target inventory, inventory, shipment, upper inventory threshold and lower inventory threshold are adjusted based on the forecast of cycle time and wafer start times (or calculated) at operation 715. After operation 716 and at operation 717, a decision of if the end of product life cycle (or end of production) has been reached or not is made. If the answer is "yes", the process flow is completed. If the answer is "no", process flow returns to operation 713 to review and compare real inventory and target inventory data at the next review period. In addition, if the answer at operation 714 is "no", the operation proceeds to operation 717.

Figure 8:
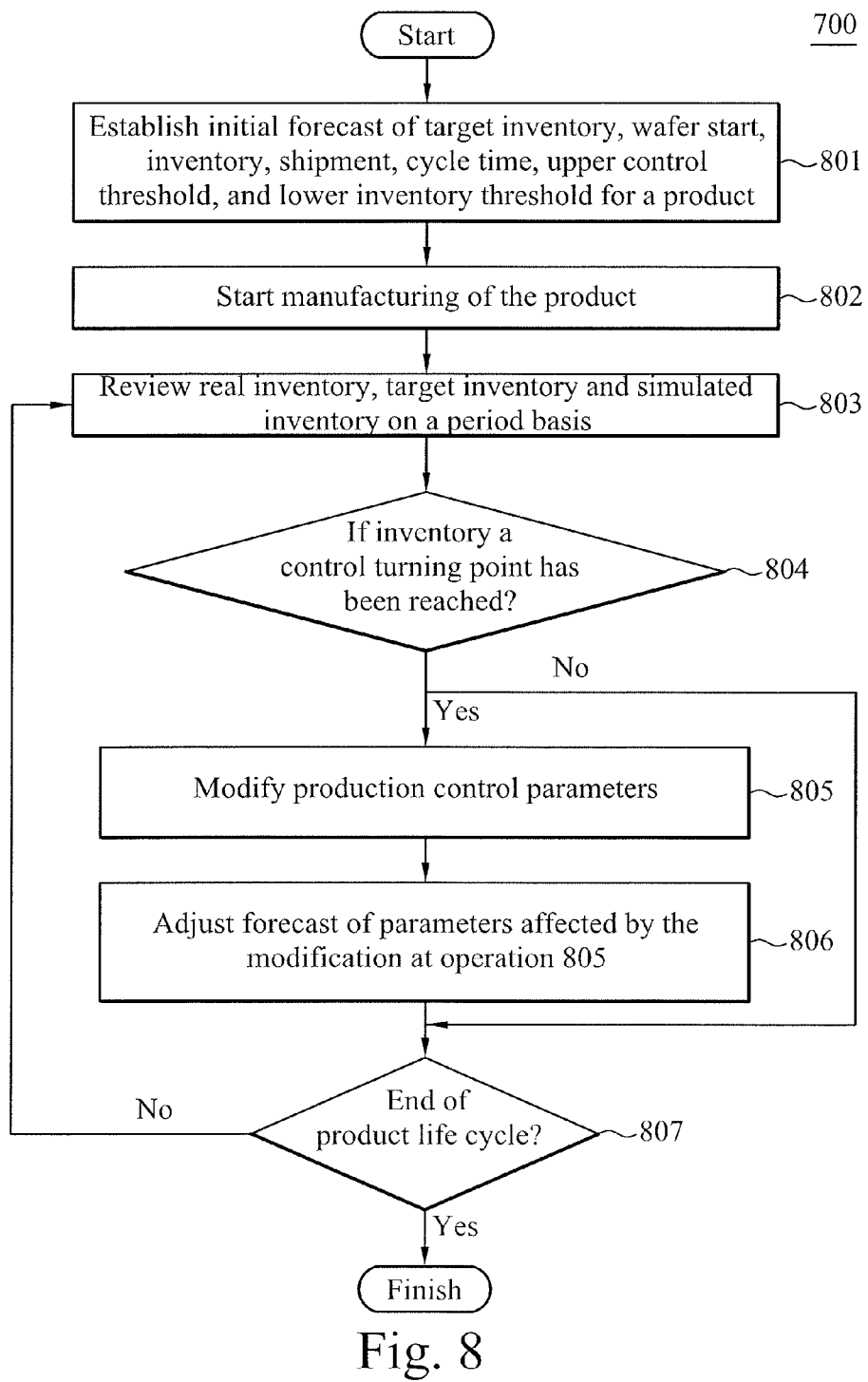
FIG. 8 is a high-level process flow diagram of managing product inventory, in accordance with one embodiment of this disclosure.

FIG. 8 shows a process flow 800 of managing product inventory using inventory control algorithms (such as algorithms I, II, III mentioned above), in accordance with one embodiment of this disclosure. At operation 801, the initial forecast for target inventory, wafer starts, shipment, inventory, cycle time, upper inventory threshold and lower inventory threshold are established for a product (a particular type of semiconductor chip). At operation 802, the manufacturing of the product is started. Alternatively, operation 801 can occur after operation 802. At operation 803, the forecast of inventory data is reviewed on a periodic basis. At operation 804, a decision is made regarding if an inventory control turning point has been reached. If the answer is yes, the operation proceeds to operation 805. At operation 805, production control parameters, such as target inventory, cycle time, wafer starts, etc., are modified to bring inventory level to a safe operating level. At next operation 806, the forecast of other production and inventory control parameters, are adjusted based on the modifications at operation 805. After operation 806 and at operation 807, a decision of if the end of product life cycle (or end of production) has been reached or not is made. If the answer is "yes", the process flow is completed. If the answer is "no", process flow returns to operation 803 to review and compare real inventory and target inventory data at the next review period. In addition, if the answer at operation 804 is "no", the operation proceeds to operation 807.

Utilizing the methods and systems described above help to reduce the cost of overstock and the risk of stockout and result in substantial cost saving and good customer relationship. The embodiments of methods and systems described above are merely examples. Other variations of methods and systems based on the same principles are also applicable. In addition, the methods and systems can be modified to be applied to inventory control of products that are not semiconductor chips.

Figure 9:
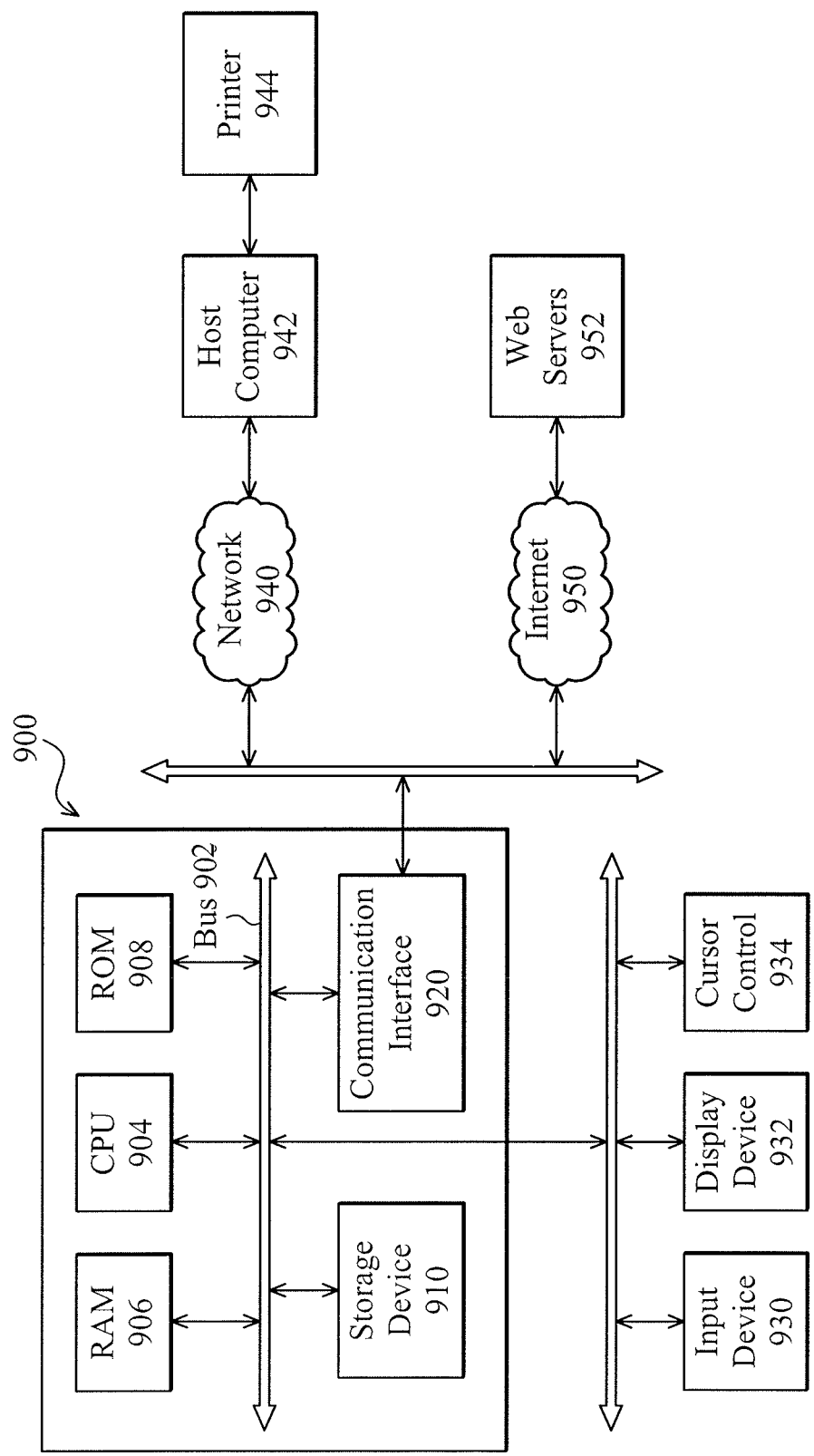
FIG. 9 is an example of a special-purpose or general-purpose computer for implementing a dynamic inventory control system in accordance with at least one embodiment of this disclosure.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Such a general-purpose or special-purpose computer 900 is illustrated in FIG. 9. The computer 900 comprises a central processing unit (CPU) 904 that executes instructions stored in read only memory (ROM) 908, and storage device 910, using random access memory (RAM) 906 as working memory. The CPU 904 communicates with these other devices over a bus 902. The computer 900 interfaces with a user via input device 930, display device 932 and cursor control 934. The computer 900 also comprises a communication interface 920 that enables communication with other computers such as Web server 952 and host computer 942 via network 940 or the Internet 950. Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer, such as computer 900 (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, or other type of media/machine-readable medium suitable for storing electronic instructions. Such machine-readable media may be read, for example, by an input device 930 attached to computer 900. For example, instructions for performing described processes may be transferred from a remote computer (e.g., a server) to a requesting computer (e.g., a client) by way of data signals embodied in a carrier wave or other propagation medium via a communication link (e.g., network connection).

One aspect of this description relates to a production management system for dynamically controlling inventory of a semiconductor product to prevent overstock and stockout. The production management system includes a production planning module including components containing data of demand forecast, and customer order. The production management system further includes a dynamic inventory control module including a dynamic inventory control simulation module and an inventory management system, wherein the inventory management system is configured to record real inventory data, and wherein the dynamic inventory control simulation module includes simulators for target inventory, future inventory, future shipment and semiconductor product production.

Another aspect of this description relates to a production management system for dynamically controlling inventory of a semiconductor product to prevent overstock and stockout. The production management system includes a production planning module including components containing data of demand forecast, and customer order. The production management system further includes a dynamic inventory control module including a dynamic inventory control simulation module and an inventory management system, wherein the dynamic inventory control simulation module is configured to adjust a target inventory if a current inventory is beyond a threshold multiplied by the target inventory for M number of review cycles.

Still another aspect of this description relates to a production management system for dynamically controlling inventory of a semiconductor product to prevent overstock and stockout. The production management system includes a production planning module comprising a first processor configured to establish an initial forecast of target inventory, wafer starts, inventory, shipment, cycle time, upper inventory threshold, and lower inventory threshold for a product including components containing data of demand forecast, and customer order. The production management system further includes a dynamic inventory control module comprising a second processor configured to: review and compare real inventory and target inventory on a periodic basis. The second processor is further configured to reduce the forecast of target inventory, responsive to a determination that the real inventory exceeds the upper inventory threshold for a number of consecutive review periods. The second processor is further configured to repeat the step of reviewing and comparing real inventory and target inventory data and the step of reducing the forecast of target inventory, responsive to a determination that an end of product life cycle has not been reached.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and this disclosure is not to be limited to the details given herein, but may be modified within the scope and equivalents of the appended claims.

The invention claimed is:

1. A production management system for dynamically controlling inventory of a semiconductor product to prevent overstock and stockout, comprising:
   a production planning module, the production planning module including components containing data of demand forecast, and customer order; and
   a dynamic inventory control module, the dynamic inventory control module including a dynamic inventory control simulation module and an inventory management system, wherein the inventory management system is configured to record real inventory data, and wherein the dynamic inventory control simulation module includes a processing unit configured to perform a simulation for target inventory, future inventory, future shipment and semiconductor product production.

2. The production management system of claim 1, wherein the production planning module further includes components containing data of fab capability, product technology of the semiconductor product, and product priority for the semiconductor product.

3. The production management system of claim 1, wherein the simulator for semiconductor product production simulates wafer start and cycle time.

4. The production management system of claim 1, wherein the dynamic inventory control module receives data from the production planning module in real time.

5. The production management system of claim 1, wherein the production planning module receives demand forecast from customers in real time.

6. The production management system of claim 1, wherein the production planning module is configured to calculate a demand curve based on at least one of demand forecast data from customers, sales data of the customers, inventory data from the customers, shipping histories, or market research data.

7. The production management system of claim 1, wherein the inventory management system is configured to record real shipment data.

8. The production management system of claim 1, wherein the target inventory simulator is configured to calculate a target inventory based on an initial inventory and a projected change in inventory.

9. The production management system of claim 8, wherein the target inventory simulator is configured to calculate the projected change in inventory based on current inventory, future shipment information, and forecast demand.

10. The production management system of claim 9, wherein the future inventory simulator is configured to calculate the forecast demand based on current inventory, future shipment information and wafer start information, wherein wafer stat information is a number of usable chips obtained per period.

11. The production management system of claim 9, wherein the future shipment simulator is configured to calculate the future shipment information based on at least one of historical data, seasonal effects, target inventory, or current inventory.

12. The production management system of claim 1, wherein the dynamic inventory control simulation module contains a production simulator containing a wafer start simulator configured to calculate a number of usable chips obtained per period and a cycle time simulator configured to calculate a time to finish a layer of a chip.

13. A production management system for dynamically controlling inventory of a semiconductor product to prevent overstock and stockout, comprising:
  a production planning module, the production planning module comprises:
    a demand forecast component configured to calculate a demand curve based on information received; and
    an order component configured to store customer order information; and
  a dynamic inventory control module, the dynamic inventory control module connected to the production planning module, the dynamic inventory control module comprising:
    a dynamic inventory control simulation module comprising a processing unit configured to determine target inventory information, future inventory information, future shipment information, and semiconductor product production information; and
    an inventory management system configured to store information related to current inventory information and shipment information.

14. The production management system of claim 13, wherein the dynamic inventory control system is configured to reduce a cycle time for producing semiconductor products or increase a number of starts for semiconductor products in response to a measured inventory below a lower threshold over a first predetermined number of review cycles.

15. The production management system of claim 14, wherein the dynamic inventory control system is configured to lower a target inventory value in response to a measured inventory exceeding an upper threshold over a second predetermined number of review cycles.

16. The production management system of claim 15, wherein the first predetermined number of review cycles is less than the second predetermined number of review cycles.

17. The production management system of claim 14, wherein the upper threshold is a variable value.

18. The production management system of claim 13, wherein the dynamic inventory control system is configured to reduce a cycle time for producing semiconductor products or increase a number of starts for semiconductor products in response to a determined future inventory below zero at a predetermined lead time from a current review period.

19. The production management system of claim 13, wherein the dynamic inventory control system is configured to reduce a cycle time for producing semiconductor products by increasing a priority level of the semiconductor products.

20. A production management system for dynamically controlling inventory of a semiconductor product to prevent overstock and stockout, comprising:
  a production planning module, the production planning module comprises:
    a demand forecast component configured to calculate a demand curve based on information received; and
    an order component configured to store customer order information; and
  a dynamic inventory control module, the dynamic inventory control module connected to the production planning module, the dynamic inventory control module comprising:
    a dynamic inventory control simulation module comprising a processing unit configured to determine target inventory information, future inventory information, future shipment information, and semiconductor product production information, wherein the dynamic inventory control simulator module comprises:
    a production simulator module configured to determine, using the processing unit, a number of starts of a semiconductor product and a cycle time for producing a finished product of the semiconductor product; and
    an inventory management system configured to store, using the processing unit, information related to current inventory information and shipment information.

* * * * *